UNITED STATES PATENT OFFICE.

MARY C. ROSS, OF NEW YORK, N. Y.

IMPROVED COMPOSITION FOR SALVE.

Specification forming part of Letters Patent No. 40,643, dated November 17, 1863.

*To all whom it may concern:*

Be it known that I, MARY C. ROSS, of the city, county, and State of New York, have invented a new and useful compound for a salve for burns, sores, bruises, boils, and injuries to or diseases of the skin, which salve aids in the healing of the skin when thus injured; and I do hereby declare the following to be a full, clear, and exact description of the ingredients employed, and of the mode of compounding such salve.

I take one pound and a half (1½ lb.) of pitch, one pound (1 lb.) of beeswax, one pound (1 lb.) of hog's lard, and one pound (1 lb.) of mutton-tallow, or in these proportions, and mix them thoroughly together by the application of heat and stirring while in a suitable vessel until they are thoroughly commingled, and I find that one pound of dog's fat and four ounces of white lead may be advantageously added to such compound, although not indispensable.

The salve thus produced when applied to injuries or diseases of the skin tends to exclude the atmosphere and aid in the more speedy healing of the parts and the re-formation of the cuticle.

What I claim, and desire to secure by Letters Patent, is—

The salve composed of the ingredients and in the proportions specified, the same being a new article of manufacture.

In witness whereof I have hereunto set my signature this 28th day of September, A. D. 1863.

MARY C. ROSS.

WM. G. ROSS,
WM. E. CACHE.